United States Patent
Kaplan

(10) Patent No.: US 7,187,763 B1
(45) Date of Patent: Mar. 6, 2007

(54) SECURE METHOD FOR CONFERENCING THROUGH A REMOTE PBX

(75) Inventor: Alan E. Kaplan, Morris Township, Morris County, NJ (US)

(73) Assignee: AT&T Corp., New York, NY (US)

(*) Notice: Subject to any disclaimer, the term of this patent is extended or adjusted under 35 U.S.C. 154(b) by 699 days.

(21) Appl. No.: 10/294,237

(22) Filed: Nov. 14, 2002

(51) Int. Cl.
*H04M 3/42* (2006.01)
*H04M 11/00* (2006.01)
*H04M 1/00* (2006.01)

(52) U.S. Cl. .............................. 379/202.01; 379/93.09; 379/93.21; 379/158

(58) Field of Classification Search ............. 379/93.09, 379/93.21, 158, 202.01, 204.01, 205.01, 379/206.01, 266.09
See application file for complete search history.

(56) References Cited

U.S. PATENT DOCUMENTS 5,764,639 A * 6/1998 Staples et al. .............. 370/401
6,359,892 B1 * 3/2002 Szlam ........................ 370/401
6,560,223 B1 * 5/2003 Egan et al. ................. 370/356

* cited by examiner

Primary Examiner—Bing Q. Bui
(74) Attorney, Agent, or Firm—Henry T. Brendzel

(57) ABSTRACT

An arrangement is employed where a switching unit that conferences a remote telephone with other telephones pursuant to requests that originate via a digital connection from a site that includes the remote telephone. In one illustrative embodiment, the switching unit is an ISDN telephone coupled to a PBX. The remote telephone is connected to a conference point within the PBX via the PSTN. The requests from the remote site originate from a computer, and the digital connection comprises a packet network. Advantageously, the communication through the packet network is encrypted. Conferencing is initiated and controlled by the computer at the remote site, by communicating with the PBX via the ISDN telephone. In another embodiment the switching unit is adapted to create and maintain a plurality of conference calls, pursuant to control signals arriving at a port of the arrangement that is part of the digital connection.

39 Claims, 6 Drawing Sheets

SECURE METHOD FOR CONFERENCING THROUGH A REMOTE PBX

CROSS REFERENCE TO RELATED APPLICATIONS

This invention is related to U.S. patent application Ser. No. 10/026,080, filed Dec. 22, 2001, titled "System for working at a remote office PBX," which is incorporated by reference herein, and U.S. patent application Ser. No. 09/894,173, filed Jun. 28, 2001, titled "Arrangement for work-at-home telecommunication services," which is also incorporated by reference herein.

BACKGROUND

This invention relates to telephony and, more particularly, to conferencing. Further, this invention related to arrangements where a data network is employed in conjunction with to the conventional public switched telephone network (PSTN).

Conferencing a group of participants is not new. Such conferencing is typically accomplished by bridging a number of calls at a single point, that point being local to one of the conferees, or within the telephone network.

The use of a packet network in conjunction with the PSTN is also not new. The ROSE service, offered by AT&T, provides a virtual telephonic presence through an arrangement such as the one depicted in FIG. 1. In office 10, a user's business telephone 11 is connected to a central office in Public Switched Telephone Network (PSTN) 100 through PBX 50. At a remote location, such at home 30, a telephone 32 is connected to (perhaps a different) a central office in PSTN 100, and a computer 31 (which may be a PC) is connected to digital network 200 (e.g., the Internet) through an encryption/decryption circuit 33. PC 31 is connected through network 200 to coupler 25 that includes a processor 20, and encryption/decryption circuit 21. More specifically, coupler 25 has two ports, with one connected to digital control port 51 of PBX 50, and the other connected to network 200. Processor 20 interacts with signals of port 51 directly, and with the signals of the port connected to network 200 via encryption/decryption module 21 (which may be hardware or software). Conventionally, processor 20 includes memory for storing programs and data. The PBX is provisioned to inform port 51 about the state of, and the signals flowing through, the PBX lines that are connected to office telephone 11. Also, port 51 is provisioned to accept control signals relating to the lines that are connected to office telephone 11.

In operation, when a call comes into PBX 50 for office telephone 11 (for example, from telephone 40) and appears on one of the PBX lines that connect to telephone 11 with a ringing signal (for example, line 13), the provisioning in PBX 50 causes the PBX to send a ringing signal message to port 51. Responsive to this signal, processor 20 sends a ringing signal to PC 31 through the path that includes circuit 21, network 200, and circuit 33. Circuit 21 encrypts the message, and circuit 33 decrypts the message so as to maintain privacy of communication between processor 20 and PC 31. There are embodiments of this service without the encryption and decryption phases.

PC 31 includes a "screenphone" application 35 that is adapted to interact with processor 20. This application runs concurrently with whatever other applications computer 31 is asked to run. Application 35 presents an image on the screen of PC 31 that includes telephone 11, each of the lines that connect telephone 11 to network 100, a "ringer," a keypad, and various "tools" for commanding different actions. In response to the received ringing signal message, application 35 outputs an alert from PC 31 that shows the specific line that is ringing on telephone 11, which allows an employee to whom telephone 11 is assigned and who is at home in proximity of PC 31 (rather than in office 10), to become aware of the incoming call at office telephone 11. Concurrently with the ringing at application 35, processor 20 requests PBX 50 to redirect, or transfer, the incoming call to telephone 32, and PBX 50 carries out the requested action in a conventional manner. In due course, telephone 32 rings, the employee picks up the phone (knowing that the phone call related to office telephone 11 because application 35 shows telephone 11 ringing) and converses with the user at telephone 40 in the same way that the employee would have done had the employee been in office 10.

By allowing processor 20 to enter control signals that mimic, in their effect, the signals that telephone 11 can present to PBX 50, and conversely, to deliver appropriate messages to PC 31 in response to each control signal that might be applied to the PBX lines that connect to telephone 11, the environment of office 10 can be emulated in home 30.

Of course, the FIG. 1 arrangement is dependent on having a PBX.

In patent application Ser. No. 09/894,173, filed Jul. 20, 2001, I disclosed a system where a virtual presence at an office telephone is realized even in the absence of a PBX connection, as shown in FIG. 2. This is achieved by employing a multi-line telephone that includes a digital port that provides signals in response to changes in the state of the telephone, and which accepts signals that change the state of the telephone. The virtual presence is achieved by connecting the digital port to a local processor that interacts with an application on a remote computer that is co-located with a conventional telephone, which telephone can be a single line telephone. The processor is disclosed to be connected the remote computer digital network, and to provide security in applications where the digital network is insecure, encryption and decryption modules are placed on either end of the digital network connection.

In application Ser. No. 08/899,625, filed Jul. 5, 2001, I disclosed a system where a telephone answering system that may have stored messages received from the PSTN can be accessed securely, both for storing messages and for retrieving message by going though an insecure medium such as the public packet network.

A need exists for setting up conferences where, for reasons of delay or economy, one wishes to avoid using local bridging but is willing to employ some processing equipment at each site of the conference.

SUMMARY

An advance in the art is realized by an arrangement where a switching unit that conferences a remote telephone with other telephones pursuant to requests that originate at a site that includes the remote telephone and arrive at a digital port of the arrangement via a digital connection. In one illustrative embodiment, the switching unit is an ISDN telephone that is connected to a PBX line, having the telephone's data port connected to the digital port. The remote telephone is connected to the conference within the PBX via the PSTN, to which the PBX is connected via trunks. The requests from the remote site originate from a computer, and the digital connection comprises a packet network. Advantageously, the communication through the packet network is made secure with encryption and decryption modules at the digital port and the remote site ends of the packet network. Conferencing is initiated and controlled by the computer at the remote site, by communicating with the PBX via the digital port and the ISDN telephone.

In another embodiment the switching unit is adapted to create and maintain a plurality of conference calls, pursuant to control signals arriving at the digital port of the arrangement, the ISDN telephone is replaced with a plurality of interface modules, each of which is associated with a different one of said conference calls, and a router is included to allow each of the plurality of interface module to communicate with a different remote site.

DETAILED DESCRIPTION

Figure 1:
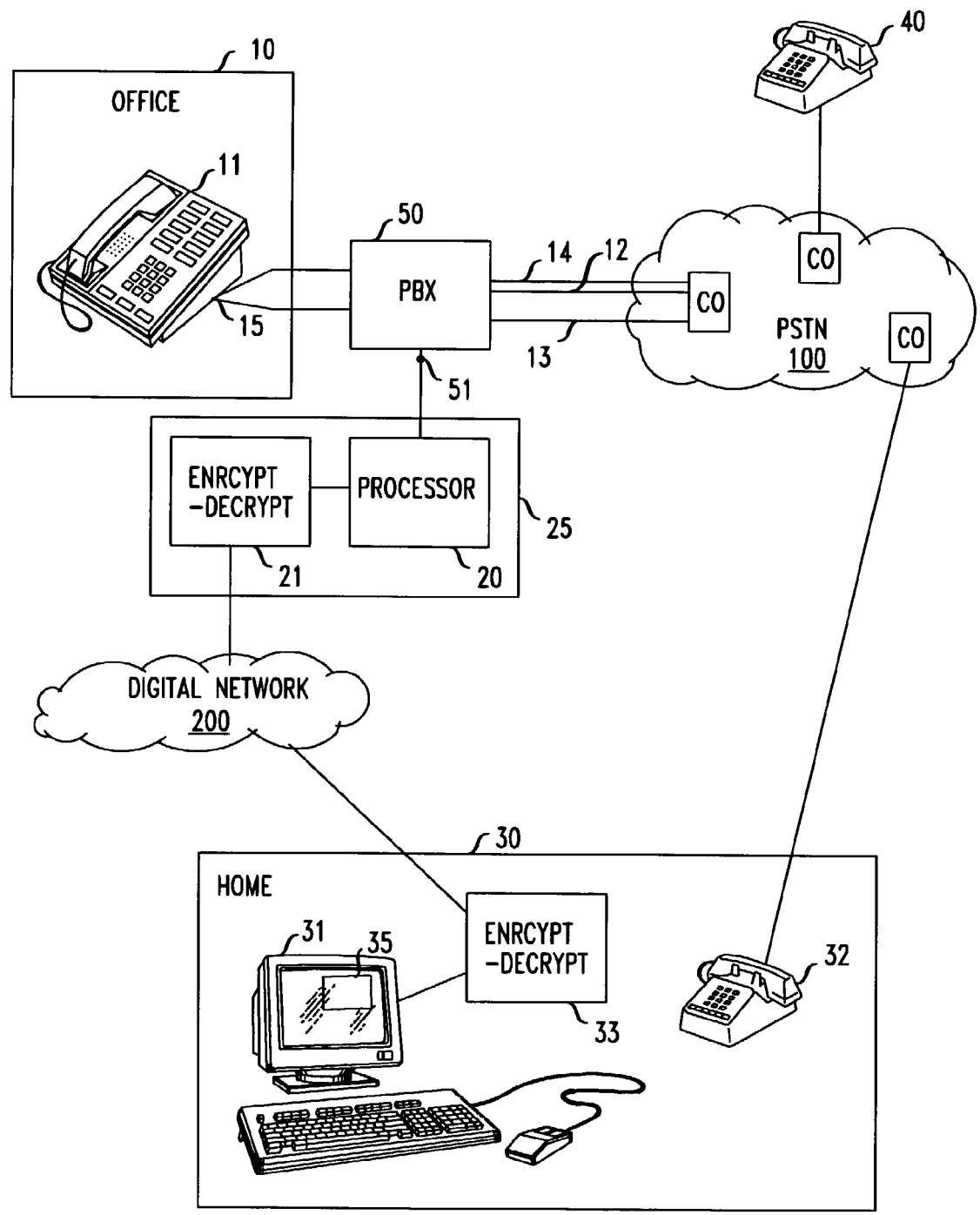
FIG. 1 show presents a "work at home" arrangement that provides a virtual presence in an office having a telephone connected to a PBX by controlling the PBX.
Figure 2:
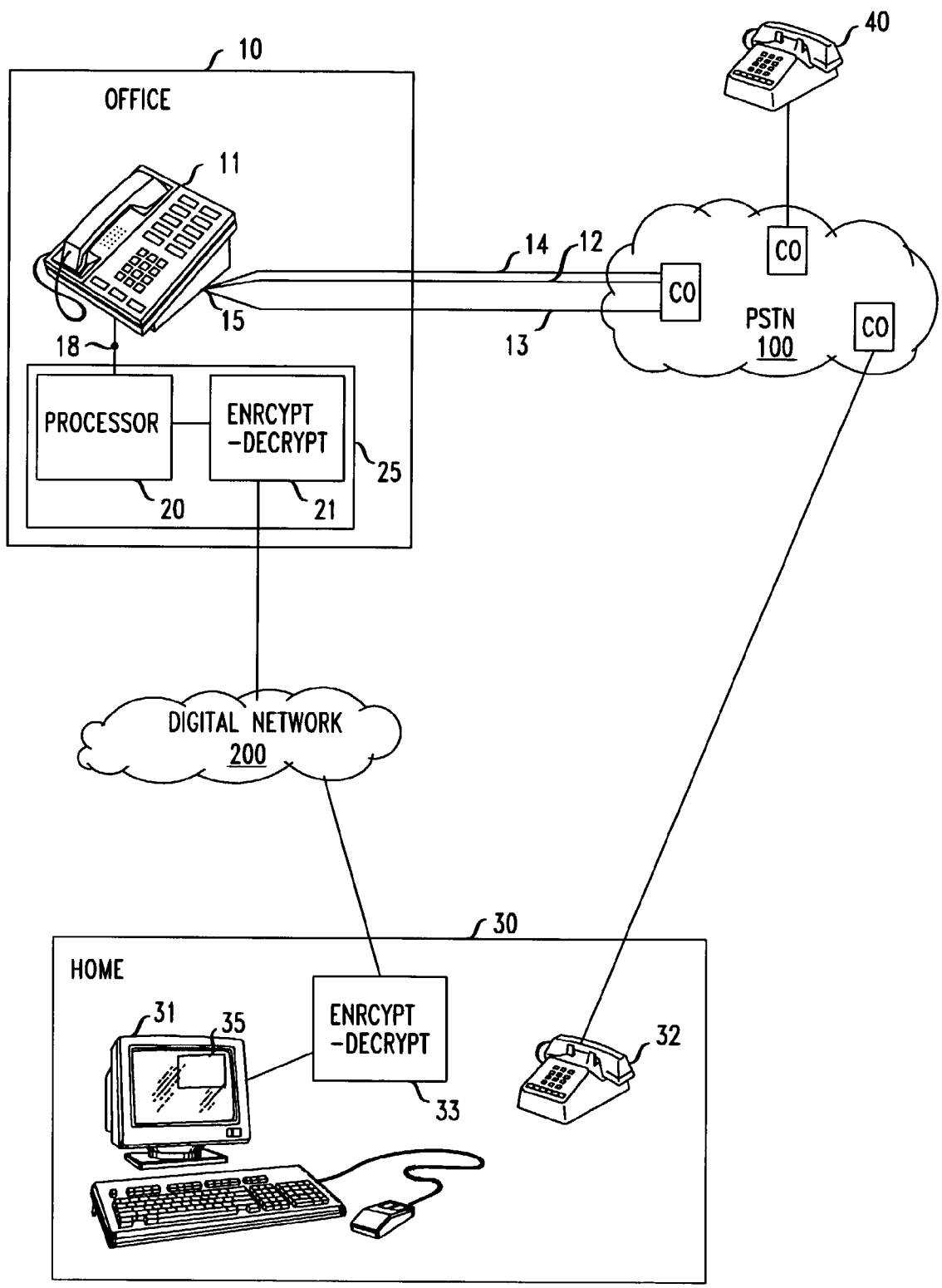
FIG. 2 presents a "work at home" arrangement that provides a virtual presence in an office having a telephone connected to a PBX by controlling the telephone.
Figure 3:
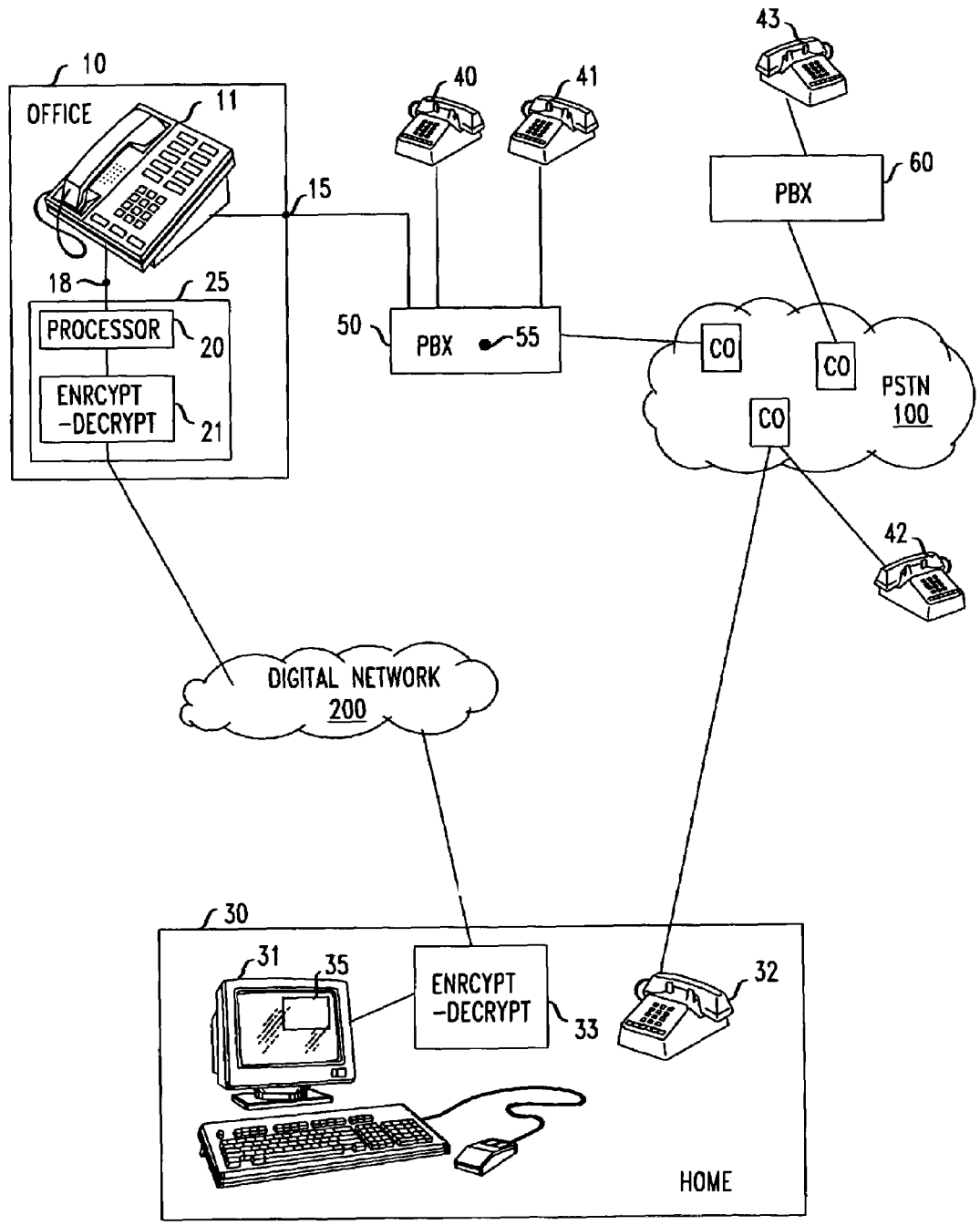
FIG. 3 depicts an arrangement that provides conferencing in a PBX, for a telephone remote from the PBX, pursuant to control messages provided to the PBX from a remote computer, via a path that includes a data network and a telephone that is connected to the line side of the PBX.

FIG. 3 depicts one arrangement in accord with the principles disclosed herein, which is very similar to the arrangement shown in FIG. 1, with one of the differences being that module 25 is connected to a digital control port of office telephone 11 which, for example, is an ISDN telephone with a physical connection to PBX 50 (via port 50) that contains two conversation channels and one signaling channel (2B+D). All other elements in FIG. 3 that have like labels to corresponding elements in FIG. 1 have corresponding functionalities. Telephone 11 also includes a digital port 18 which outputs signals in response to changes in the state of the telephone, for example signals that mimic the control signals applied to the telephone via (a) the user interface of the telephone, or (b) port 15 that is connected to PBX 50. Port 18 also accepts signals that change the state of the telephone, for example signals that cause telephone 11 to send control signals to port 15 over the D channel.

The assumption is that the party that normally is present in the vicinity of telephone 11 is present, instead, at remote office 30, and the objective is for that party to establish a conference between the user and telephones 40 and 41. The process for the party at office 30 creating a conference connection with telephones 40 and 41 is depicted in the flowchart of FIG. 4.

Before proceeding with a disclosure of this process, it is noted that PBX 50 is a PBX that allows telephone 11 to establish a conference with other telephones that are connected to the line side of PBX 50. That is, telephone 11 can initiate an interaction with PBX 50 wherein telephone 11 specifies the conferees, and PBX 50 forms a bridging point to which all of the conferees, including telephone 11 are coupled. This is a capability that is available in a number of commercial PBXs. For illustrative purposes, the bridging point in PBX 50 is depicted in FIG. 3 by black dot 55 within the PBX.

It is also noted that module 21 within coupler 25 and module 33 within remote office 30 combine with digital network 200 to form a secure digital path between telephone 11 and remote office 30. It should be appreciated that network 200 can be any other network that, combined with modules 21 and 33, yields a digital path that, preferably, is secure. Module 33 can be a physical module that is distinct from computer 31, or it can be a software module within computer 31. Likewise, module 21 can be a physical module that is distinct from processor 20, or it can be a software module within processor 20.

Figure 4:
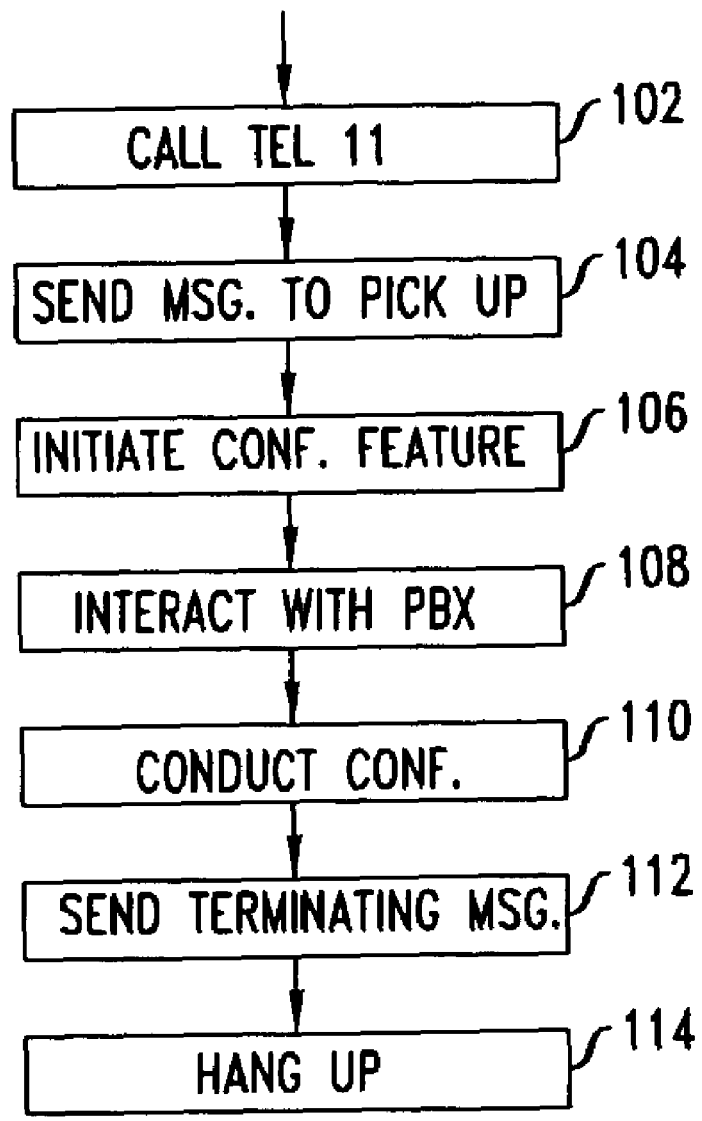
FIG. 4 is a flowchart of a process in accord with the principles disclosed herein.

Turning attention to FIG. 4, if a user at remote office 30 does not already have an established data connection between an application that is running on computer 31 and presents a window 35 on the screen of computer 31 (for short, application 35), and processor 20 of coupler 25, through which the state of telephone 11 can be monitored/controlled via port 18, step 102 establishes that connection. This connection is established with the application running on computer 31 providing a user ID (e.g., Adam) and a password to the application running on processor 20. Providing a user ID and a password enables module 25 to be sensitive only to a bona fide user—in this case, to Adam. Alternatively, the keys employed by modules 21 and 33 are arranged to be such that module 25 is responsive to signals of an application that is running on computer 31 and passes through module 33.

Following step 102, control passes to step 104, which establishes a voice connection between telephone 11 and telephone 32. Illustratively, the voice connection is established by having application 35 directing telephone 11 to dial telephone 32. Alternatively, the user at office 30 can dial telephone 11 directly from telephone 32, and send a message via the digital path to port 18 by means of application 35 that directs telephone 11 to pick up.

Once the voice connection between telephone 32 and telephone 11 is established, control passes to step 106, where the user at office 30 initiates execution of a conference feature at telephone 11. This is initiated by application 35 sending a message to telephone 11 (via port 18) that directs telephone 11 to send an appropriate control signal to PBX 50 (over the D channel). In response to this control signal, PBX 50 allows telephone 11 to specify which other telephone(s) is (are) to be conferences to the call between telephones 11 and 32, through an interaction with telephone 11, which is effected in step 108.

More specifically, if PBX 50 sends a control signal to telephone 11 which causes the display on telephone 11 to direct a user to enter the telephone number of a conferee, in accordance with the principles disclosed herein that information is communicated to application 35 (via port 18, module 25, network 200, module 33), application 35 presents the request for information to Adam via the screen of computer 31, Adam supplies the telephone number of a conferee telephone, for example, the telephone number of telephone 40, and that number is forwarded to PBX 50 via network 200 and telephone 11. PBX 50 calls telephone 40, and when telephone 40 goes off-hook, PBX 50 indicates to telephone 40 that it is being connected to a conference, and proceeds to connect it to conferencing point 50. Control then passes to step 110, where the telephonic conference is being held.

Alternatively, instead of sending control signals, in step 108 PBX 50 might interact with telephone 11 aurally, for example, via an associated interactive voice response unit (IVR) unit that sends verbal instructions/queries to telephone 11 and receives corresponding responses (voice, or DTMF, for example). In such an arrangement, the instructions/queries are heard at the earpiece of the telephone 32 because it is already connected to the voice path of telephone 11 and, therefore, Adam at office 30 can respond appropriately. That is, the user's voice and/or DTMF signals originate at telephone 32, and reach the IVR of PBX 50 via the voice connection between telephones 11 and 32. The IVR captures theses signals and acts accordingly.

When seeking to conference another telephone the same process can be applied, with Adam causing telephone 11 to initiate its conferencing feature, and specifying the conferee either through application 35 or through the voice path between telephone 32 and conference point 55 within PBX 50. The conferee can be other than a telephone that is connected to the line side of PBX 50, such as telephone 42, or telephone 43 that is coupled to another PBX.

It should be appreciated that while telephone 11 can be a conventional ISDN telephone, the combination of telephone 11 and processor 20 can also be replaced with a module that includes a digital control channel for communicating with PBX 50, a digital channel for communicating with data network 200, processing capability for translating between the signaling schema on the channel to PBX 50 and the signaling schema on the channel to data network 200, and processing capability of limiting communication over network 200 to a specific person, or persons.

Figure 5:
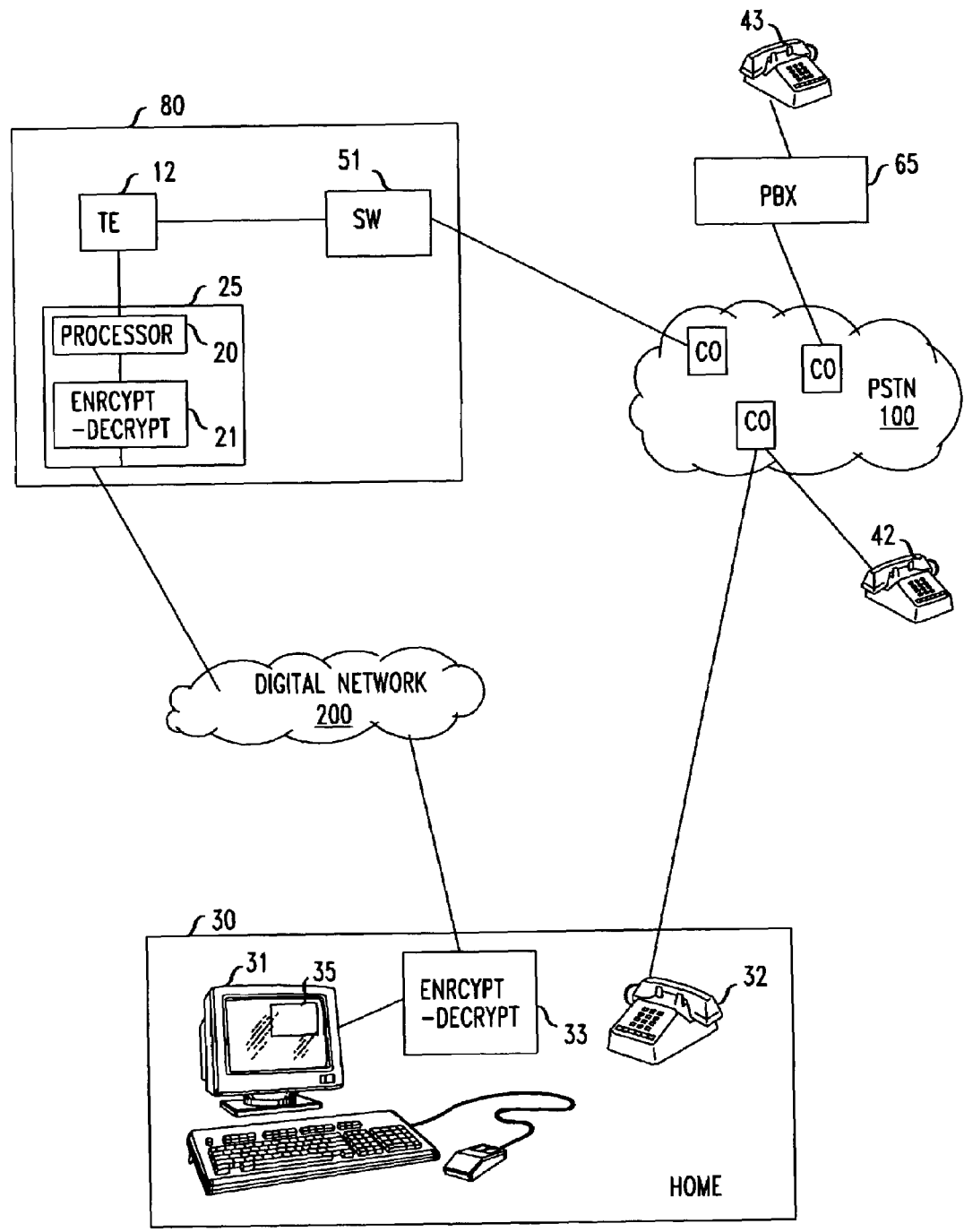
FIG. 5 is a block diagram of a server arrangement that provides conferencing capability to users.

A somewhat different arrangement is depicted in FIG. 5, where server 80 contains, illustratively, a telephone emulator communication module 12 that possesses the above-described functionalities of ISDN telephone 11, and which is connected to switch 51 that, with respect to outgoing calls and conferencing capabilities, has the functionalities of PBX 50. Not unlike the arrangement in FIG. 3, module 25 interconnects element 12 to digital network 200, and it contains the serial connection of processor 20 and encryption/decryption module 21.

Unlike the FIG. 3 arrangement, which allows only Adam to conference from anywhere with numerous telephones with the help of his office phone 11 and PBX 50, by interacting with his office phone via digital network 200, the FIG. 5 arrangement is generic in the sense that it allows anyone to create a conference by interacting with module 12 and switch 51 via digital network 200. To that end, while the communication via network 200 needs to be secure from interlopers (though not necessarily from eavesdropping) it is necessary to allow anyone to establish a connection to module 12. Public key encryption arrangements are well suited for such situations. For example, in the first communication message, Beth (for example, characterized by the source address of the packet originating from Beth) sends her public key to module 21, in the clear or encrypted with the public key of module 21. Thereafter, Beth's payload messages to module 21 are encoded with Beth's secret key. While module 21 can decrypt the payload messages of packets arriving from Beth, and eavesdropper who have Beth's public key can also decrypt her messages, no one can create message that would be considered to originate from Beth.

It may be noted that module 12 can be merged into switch 51, particularly if switch 51 is a stored program controlled unit that is specially designed for server 80 (rather than employing a stripped-down conventional PBX), or module 12 can be merged into processor 20. It is even possible that the functionalities of module 25, as well as module 12 can be merged into switch 51.

Figure 6:
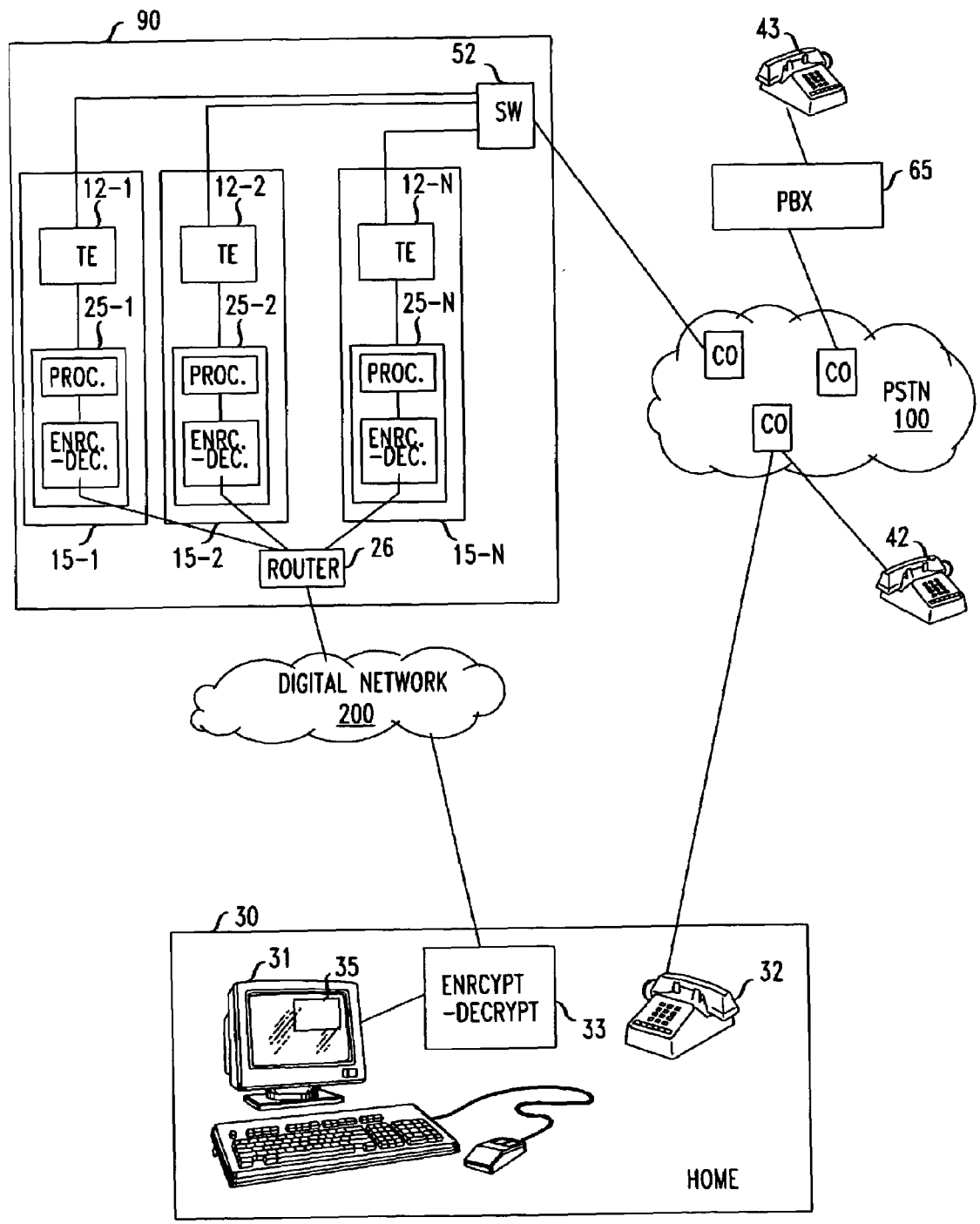
FIG. 6 depicts a server arrangement that provides conferencing to a plurality of concurrent users.

FIG. 5 can serve any one user at a time. FIG. 6, on the other hand, depicts an arrangement that provides a conferencing service to a concurrent plurality of users. In FIG. 6, server 90 contains a plurality of subsystems 15-$i$, each of which contains a module 25-$i$ connected to a telephone emulator communication module 12-$i$. Modules 12-$i$ of these sub-systems are connected to switch 52, and modules 25-$i$ of these subsystems are connected to router 26. Switch 52 is connected to PSTN 100, and router 26 is connected to digital network 200.

As with switch 51, switch 52 is a unit that, with respect to outgoing calls and conferencing capabilities, has the functionalities of PBX 50. It has a plurality of lines, to which the above-described subsystems are connected, and a plurality of trunks that are connected to a PSTN central office. Switch 52 can support any number of conference bridging points like bridging point 55 of FIG. 3.

Router 26 is effectively a switch with an associated processor that includes a database. In operation, the processor of router 26 accepts packets from network 200, ascertains the source address of the packets, and accesses its database to retrieve database that corresponds to the packet's source address. When a record is not retrieved, the conclusion reached is that the packet represents an initial connection request from, for example, Charles. This conclusion corresponds to an assumption that the packet's payload includes Charles' public key, and responsively, the processor assigns an available subsystem 15-$i$, for example, subsystem 15-2 to Charles and creates an appropriate record in its database. When a record is successfully retrieved, such as with a subsequent transmission of by Charles the processor of router 26 deciphers the message and forward it to subsystem 15-2. Thus, as far as Charles is concerned, the arrangement that works on his behalf comprises subsystem 15-2 and switch 52, but other users can be served concurrently by the other subsystems.

The above presented the principles of this invention by means of a number of embodiments, but it should be understood that the principles disclosed herein are broader than any of the illustrated embodiments and that the scope of this invention should be considered solely by the breadth of the claims that follow. To give an example, telephone 32 is depicted as a distinct, physical, telephone. However, it can be a "softphone" that is implemented within computer 31. Also, digital network 200 is shown, which can be the Internet, for example. However, the digital path between location 30 and module 25 can go through PSTN 100. Further, the above discloses a process where a connection between telephones 11 and 32 is initiated by telephone 11 through control from computer 35. A skilled artisan would realized that such a connection can also be initiated by telephone 32. Lastly, the above disclosure employs only one line of ISDN telephone 11, but unit 11 need not be an ISDN telephone, and a plurality of lines that connect telephone 11 to PBX 50 can be employed to effect a conference call.

The invention claimed is:

1. An arrangement comprising:
   a PBX having trunks connected to a public switched telephone network, and lines to which devices can be connected; and
   a first module coupled to a line of the PBX and to a data port, which module provides for secure digital transmissions through said data port;
   where said switching unit possesses a capability to join, in response to a control signal provided by said first module, an instrument connected to another line of the PBX to a connection point within said switching unit between said first module and a telephone device that is coupled to said connection point via one of said trunks, thereby establishing a voice conference between said first module, said telephone device, and said instrument; and said first module sends said control signal in response to a request signal received at said data port.

2. The arrangement of claim 1 where said telephone device is devoid of a capability to communicate via the Internet.

3. The arrangement of claim 1 where said instrument is coupled said switching unit via one of said trunks and a network that is interposed between said instrument and said trunks.

4. The arrangement of claim 1 where said first module is coupled to said PBX line via an ISDN telephone.

5. The arrangement of claim 1 where said request signal received at said port is encrypted.

6. The arrangement of claim 1 where said first module transmits signals to said port, which signals are representative of state of said first module.

7. The arrangement of claim 1 where said first module is a telephone having one or more lines connected to said switching unit, and a digital port coupled to said data port.

8. The arrangement of claim 1 where said instrument is an ISDN telephone.

9. The arrangement of claim 1 where said first module comprises and ISDN telephone that is connected to said PBX, and a processor that is interposed between said data port and a digital port of the ISDN telephone.

10. The arrangement of claim 9 where said processor provides for conversions between signal protocols at said digital port of the ISDN telephone and signal protocols of a data network to which said data port is adapted to be connected.

11. The arrangement of claim 10 where said processor also provides encryption and decryption capability.

12. The arrangement of claim 9 where said processor includes a software nodule that imposes an authentication process via said data port prior to accepting said request.

13. The arrangement of claim 6 where said signals transmitted to said data port by said first module are encrypted.

14. The arrangement of claim 1 where said request comprises a specification of a destination address of said telephone device and a destination address of said instrument.

15. The arrangement of claim 1 where said request is a sequence of two-way communication of signals passing through said data port.

16. The arrangement of claim 15 where said sequence includes a specification of a second telephone device.

17. The arrangement of claim 1 where the request signal received at said data port comes from a computer that is co-located with said telephone device.

18. An arrangement comprising:
a PBX having a plurality of trunks connected to a public switched telephone network and a plurality of lines, which unit is adapted to create numerous conference bridging points, to maintain created conferencing bridging points, and to manage the created conferencing bridging points effectively simultaneously;
a plurality of interface modules, each coupled to a different one of said lines, each having a data port, and each constructed to include a capability to send control signals to said PBX, which control signals direct said PBX regarding establishment of a conference bridging point and regarding management of same; and
a router interposed between said data port of each of said interface modules and a digital port of said arrangement that is adapted for connecting to a digital network, where said router routes control signals received at said digital port for one or more of said interface modules to said one or more, of said interface modules, which control signals are conditioned by said one or more of said interface modules for application to said PBX and are communicated to said PBX.

19. The arrangement of claim 18 where said control signals arrive at said digital port in packets, and said router routes said packets based on source address of said packets.

20. The arrangement of claim 18 where said interface modules output information, via their respective data ports and said router, to said digital port.

21. The arrangement of claim 20 where information from one of said interface modules that is outputted at said digital port is contained in packets that are addressed to a destination that corresponds to the source address of packets received by said one of said interface modules.

22. A method executed in an arrangement that includes a PBX that includes lines for connecting to a plurality of telephone instruments and trunks for connecting to a PSTN network, comprising the steps of:
receiving an encrypted digital message from a remote location, via a network, at a port of said arrangement, which message specifies that a voice connection is to be established for a second telephone to a bridging point within said PBX to which a first telephone is connected, which bridging point is adapted to support a plurality of three or more voice connections, and communicating said message to said conferencing unit;
passing said digital message, in a decrypted form, to line of said PBX; and
said conferencing unit connecting said second telephone to said bridging point.

23. The method of claim 22 where said first telephone is at said remote location.

24. The method of claim 22 where said encrypted digital message emanates from a computer at said remote location.

25. The method of claim 24 where said first telephone is realized with a software module executed on said computer.

26. The method of claim 22 where said network is a packet network.

27. The method of claim 22 further comprising the steps of:
receiving subsequent encrypted digital messages from said remote location, via a network, at a port of said arrangement, where each of said messages specifies that a voice connection is to be established to said bridging point, or disconnected from said bridging point, relative to a specified telephone, and communicating said subsequent messages to said conferencing unit; and
said conferencing unit executing action specified in said subsequent messages.

28. The method of claim 22 where said step of receiving includes decrypting messages arrived from said remote locations.

29. The method of claim 22 where an initial message from said remote location comprises a sequence of messages that provide an authenticated identification of a user who is authorized to execute said method.

30. The method of claim 22 where said encrypted digital message emanates from a computer at said remote location.

31. The method of claim 30 where said first telephone is realized with a software module executed on said computer.

32. The method of claim 22 said encrypted digital message sequence results from an interactive session between said computer at said remote location and said server that provides a sequence of session messages.

33. The method of claim 32 where said session messages are in response to prompts delivered to said computer.

34. The method of claim 33 where an initial subsequence of session messages relates to logging said computer to said server.

35. The method of claim 33 where an initial subsequence of session messages requests connection of said first telephone to said bridging point.

36. The method of claim 33 where a first subsequence of session messages relates to logging said computer to said server, and a second subsequence of session messages requests connection of said first telephone to said bridging point.

37. The method of claim 22 where said encrypted message carries an identifier that is associated with said remote location, and said bridging point is associated with said identifier.

38. The method of claim 37 further comprising the steps of receiving subsequent encrypted digital message from a different remote location, via said network, at said port of said arrangement, which message carries an identifier that is associated with said different remote location and specifies that a voice connection is to be established for a fourth telephone to a bridging point with an associated identifier that the same as the identifier associated with said different remote location, within said conferencing unit to which a third telephone is connected, which bridging point is adapted to support a plurality of three or more voice connections, and communicating said message to said conferencing unit; and said conferencing unit connecting said fourth telephone to said bridging point with an associated identifier that the same as the identifier associated with said different remote location.

39. An arrangement comprising:

a switching unit that is adapted to conference a remote telephone with other telephones pursuant to requests that originate from a site that includes the remote telephone where the other telephones are connected to lines of the switching unit (type A lines) that are normally employed for connection to telephones; and an interface unit for receiving said requests via a digital connection with said site and applying them to the switching unit.

* * * * *